United States Patent [19]
Gearing et al.

[11] Patent Number: 5,669,563
[45] Date of Patent: Sep. 23, 1997

[54] CHIPPER SHREDDER WITH USE-ENHANCING FEATURES

[75] Inventors: Thomas W. Gearing, Wauwatosa; Andrew W. Haver, West Bend, both of Wis.

[73] Assignee: The Patriot Company, Milwaukee, Wis.

[21] Appl. No.: 377,396

[22] Filed: Jan. 24, 1995

Related U.S. Application Data

[63] Continuation-in-part of Ser. No. 97,174, Jul. 23, 1993, Pat. No. 5,385,308.

[51] Int. Cl.[6] .................................................. A01D 55/00
[52] U.S. Cl. .............................. 241/101.78; 241/101.71
[58] Field of Search ........................ 241/101.71, 101.78, 241/55, 56, 58, 92, 296; 144/176; 15/414, 246.2, 246.3, 246.4

[56] References Cited

U.S. PATENT DOCUMENTS

| | | |
|---|---|---|
| 2,825,377 | 3/1958 | Ostrowski ........................ 241/101.78 |
| 3,240,247 | 3/1966 | Lautzenheiser ...................... 146/107 |
| 3,712,353 | 1/1973 | Ferry ..................................... 241/27 |
| 3,808,782 | 5/1974 | McWilliams . |
| 3,817,462 | 6/1974 | Hamlin ............................... 241/101.7 |
| 4,824,034 | 4/1989 | Baker ................................. 241/101.2 |
| 4,951,882 | 8/1990 | Ober ...................................... 241/55 |
| 5,018,672 | 5/1991 | Peck et al. ........................... 241/37.5 |
| 5,085,376 | 2/1992 | Litchenburg ........................... 241/56 |
| 5,156,345 | 10/1992 | Baker ......................... 241/101.78 X |
| 5,340,035 | 8/1994 | Ford ...................................... 241/58 |

*Primary Examiner*—Douglas D. Watts
*Attorney, Agent, or Firm*—Jansson & Shupe, Ltd.

[57] ABSTRACT

Disclosed is a machine for comminuting lawn refuse and having a vacuum characteristic which is enhanced when organic debris is being fed into the machine grinding chamber through an opening other than that in the tube used to feed in small branches. The tube mouth has a substantially smooth sealing lip and a removable cover is fitted snugly to the lip to substantially prevent air from flowing between the lip and the cover. An embodiment of the machine has a U-shaped nozzle portion attached thereto by a hose. Such portion removes leaves and other debris from an eaves trough. A method for comminuting organic lawn debris is also disclosed.

2 Claims, 11 Drawing Sheets

CHIPPER SHREDDER WITH USE-ENHANCING FEATURES

RELATED APPLICATION

This application is a continuation-in-part of application Ser. No. 08/097,174 filed on Jul. 23, 1993, now U.S. Pat. No. 5,385,308.

FIELD OF THE INVENTION

This invention relates generally to comminuting and, more generally, to comminution of lawn refuse such as grass clippings, leaves, tree branches and the like.

BACKGROUND OF THE INVENTION

Machines, often referred to as "chipper shredders," have been in wide use for years for comminuting lawn and yard refuse. Owners of residential and commercial property use such machines to mulch organic debris such as grass clippings, small twigs and branches, leaves and the like. In the past, it had been common practice to place the comminuted debris into bags and dispose of the bags and refuse in a landfill.

More recently, municipalities are becoming more concerned about the cost of procuring landfill space. A growing number of such municipalities prohibit many types of lawn refuse from being placed into a landfill. Consequently, chipper shredder machines are increasing in importance since they reduce lawn refuse to small particle and "piece" sizes entirely suitable for use as garden, lawn and tree mulch. Chipper shredder machines play an important part in returning valuable natural organic material, pulverized lawn refuse, to the soil.

There are a number of manufacturers of such chipper shredder machines and the patent literature illustrates several different machine configurations. Examples of such machines are shown in U.S. Pat. Nos. 5,156,345 (Baker); 5,102,056 (Ober); 4,824,034 (Baker); 4,544,104 (Carlsson); 3,817,462 (Hamlin) and others. While such machines have been generally satisfactory for their intended purpose, they are characterized by certain disadvantages.

One involves the inclusion of a branch-receiving chute or tube into which small branches are thrust to be ground up by the rotor. Examples of such chutes are shown in the above-noted Ober and Baker '034 patents. Often, the tube is simply left open when not in use. If open, air flows down the tube while the vacuum hose is being used and reduces the vacuum hose "cleanup" capability of the machine. If the tube is closed when not in use, it is typical to employ a custom-fabricated closure for the purpose. One manufacturer, the assignee of the Hamlin patent noted above, uses a permanently-attached, spring-biased swinging plate.

When grinding branches, such a plate is used as a barrier to help prevent "kickback" of chips or the like toward the user's body. This is done by swinging the plate away from the tube mouth only far enough to permit a branch to be inserted through the resulting opening while yet impeding chips from being thrown out of the tube mouth.

Because of the manner of use, such plates often do not seal well with the tube mouth. This is not surprising; they are not intended to. Rather, they are intended only to occlude the tube mouth to the degree necessary to prevent kickback. To put it another way, designers of prior art tube covers apparently gave no thought to the possibility of enhancing machine vacuum. That is, such designers apparently viewed such cover as an adjunct device effective when using the tube during branch grinding but not otherwise.

Yet another disadvantage of known chipper shredders is that they have not been configured to take advantage of their considerable vacuum capability for other cleanup tasks. To put it another way, they are configured only for removing and shredding waste deposited on the lawn or at other ground-level locations.

An improved chipper shredder which incorporates features providing enhanced machine vacuum when such machine is conventionally fed through its hopper would be an important advance in the art.

OBJECTS OF THE INVENTION

It is an object of the invention to provide an improved chipper shredder overcoming some of the problems and disadvantages of the prior art.

Another object of the invention is to provide an improved chipper shredder having use-enhancing features.

Another object of the invention is to provide an improved chipper shredder having features providing enhanced machine vacuum when such machine is being fed through a hose into its hopper.

Still another object of the invention is to provide an improved chipper shredder suitable for removing and shredding waste deposited at locations other than on the lawn or at other ground-level locations. How these and other objects are accomplished will become more apparent from the following descriptions and from the drawing.

SUMMARY OF THE INVENTION

The invention involves a chipper shredder machine of the type used by, e.g., home owners, for comminuting organic debris such as lawn refuse. Such machine includes a housing having (during operation) a vacuum therein. The housing interior chipping and shredding mechanism (sometimes known as a grinding chamber) is fed through a top-loaded hopper, through a tube or through a bottom opening. If the latter is used (as is commonly the case on a "walk-behind" machine), such opening is close to the ground and organic debris is "vacuumed" from the yard through the opening. A hopper, tube or opening can be used to introduce material into the housing and, specifically, into the comminuting or grinding chamber.

In the improvement, the mouth of the tube has a substantially smooth sealing lip. A removable cover is fitted snugly to the lip and substantially prevents air from flowing between the lip and the cover. The machine vacuum is thereby enhanced when material is being introduced into the grinding chamber. More specifically, the cover includes an edge portion overlapping the lip. Such edge portion/lip "overlap" increases the sealing area for better air flow prevention.

Another aspect of the invention involves a method for comminuting lawn refuse such as leaves and small branches. Such method includes the steps of providing a machine with a housing and a tube for introducing material into the housing. Preferably, the tube has a mouth with a substantially smooth sealing lip. A cover is fitted snugly to the lip, thereby preventing air from flowing between the lip and the cover and reducing vacuum. Leaves, very small twigs and the like are then introduced into the housing, either directly through a bottom opening or top hopper, or through a vacuum hose.

When the user desires to comminute branches, the cover is removed from the lip. Such small branches are then introduced into the housing through the tube. In a highly preferred method, the fitting step includes urging the cover over the lip so that the edge portion overlaps such lip.

Another aspect of the invention involves a machine with a top-load hopper. One end of a flexible hose is attached to the hopper and the other end has a vacuum nozzle attached thereto. The machine is thereby configured to remove leaves and debris from a location other than at ground level, e.g., from an eaves trough.

In one highly preferred embodiment, the vacuum nozzle is generally U-shaped, substantially rigid and has a fanned-out portion for insertion into the trough. In another highly preferred embodiment, the vacuum nozzle includes a rigid leg portion which is elongate.

The vacuum nozzle may be manipulated by grasping the leg portion with the hands or by using a handle attached to such portion. And while the pole may be used with either embodiment, such pole is of great utility in manipulating a nozzle on which the rigid leg portion is relatively short.

Further details of the invention are set forth in the following detailed description and in the drawing.

DETAILED DESCRIPTION OF PREFERRED EMBODIMENTS

Before getting into details of the new chipper shredder machine 10, a general description is provided. Referring to FIGS. 1, 2, 6 and 10, the machine 10 includes a housing 11 having a grinding chamber portion 13 with a smooth, curved interior wall 14. Such portion 13 confines parts of a fan and comminuting assembly 15 for "processing," i.e., comminuting, lawn refuse fed into the hopper 17. The housing 11 also has a fan chamber portion 19 in which is confined other parts of the assembly 15 including a fan 21 functioning as a centrifugal blower. Such blower creates a vacuum (in the grinding chamber portion 13 which, in effect, is the fan inlet), draws refuse into the housing 11 and provides (at the fan discharge port 23) a pressurized air stream which ejects such processed refuse. The plate 25 embodying the fan 21 is "back-to-back" with a chipper plate 27 which "chips" larger branches fed into the housing 11 through a tube 29 described below. A bag 31 is attached to the fan discharge port 23 to catch such refuse for later disposal.

A generally L-shaped mounting bracket 33 is attached to that side of the housing 11 defining the grinding chamber portion 13 and has a pair of openings receiving a cross axle 35 to which are mounted a pair of wheels 37. A "prime mover" 39 (either an internal combustion engine 39a— illustrated—or an electric motor) is mounted to the bracket platform 41 and has its center of gravity 43 approximately vertically above the axle 35. This arrangement makes it very easy to tip the machine 10 rearward toward the prime mover 39 by grasping the handle 45 formed on the edge of the hopper 17. The machine 10 can then be wheeled from place to place. And the prime mover 39 is mounted very low on the machine 10 for better resistance against accidental tipover.

Figure 7:
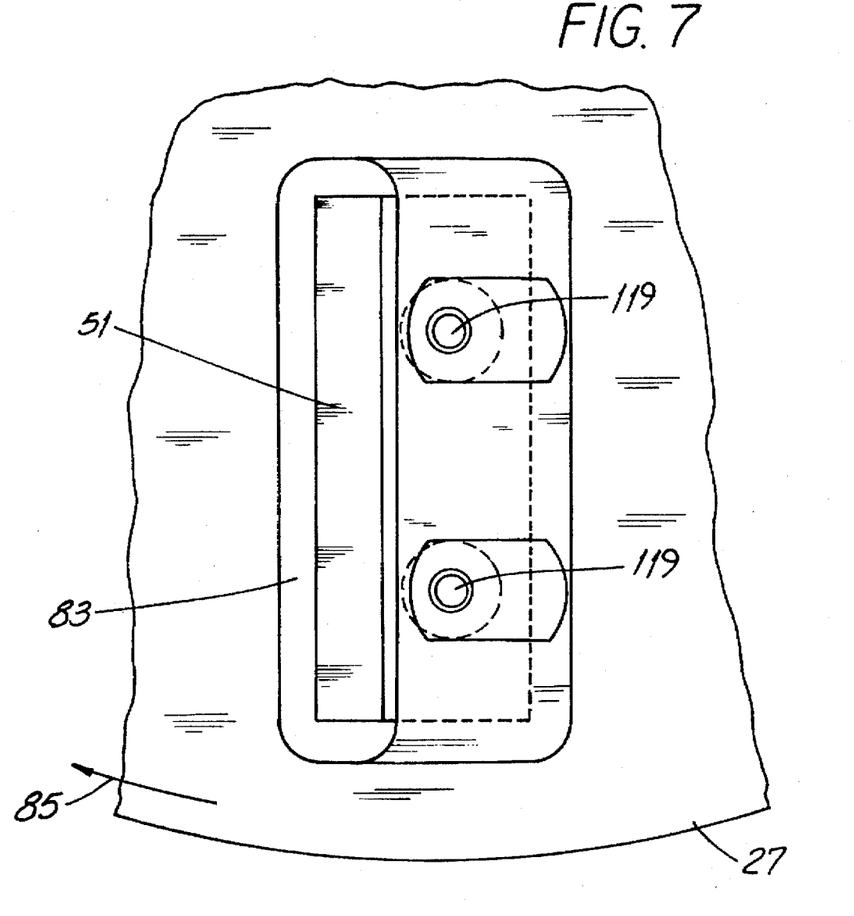
FIG. 7 is an enlarged elevation view of a portion of the chipper plate, an opening therethrough and a chipping knife mounted thereon. Parts are broken away.
Figure 8A:
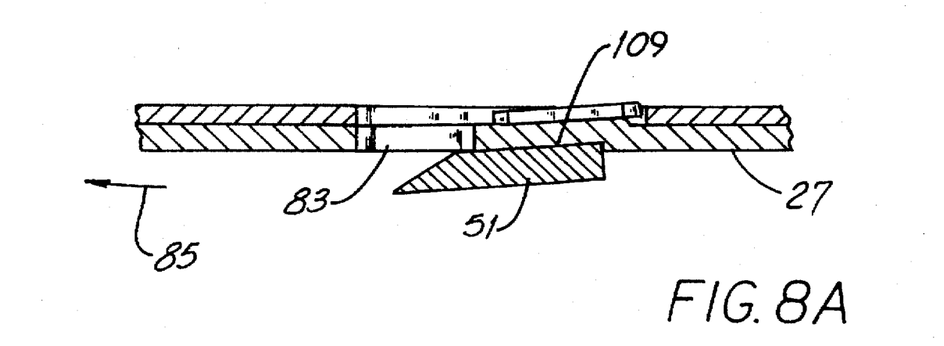
FIG. 8A is a cross-section edge view of the plate and knife of FIG. 7 and also showing the fan plate and a weld nut used to secure the knife to the plate. Parts are broken away.
Figure 8B:
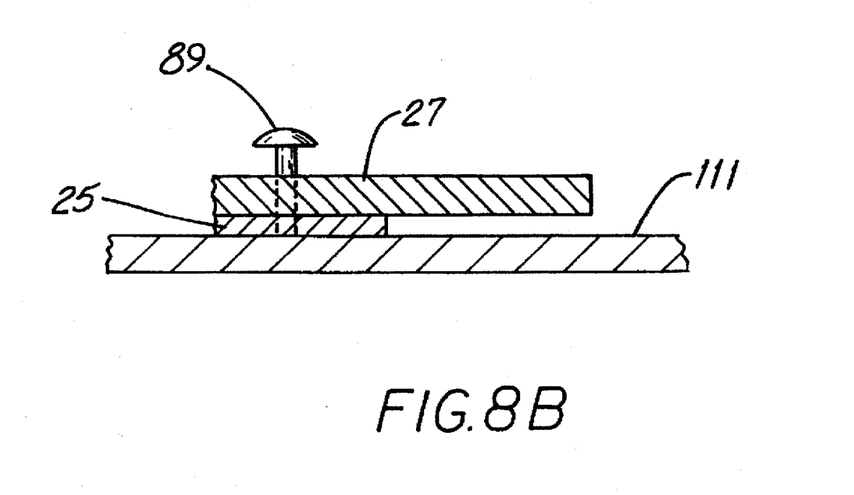
FIG. 8B is an inverted view generally like that of FIG. 8A and showing the chipper plate and an attaching rivet prior to securement.

Referring also to FIGS. 7 and 8A, a receptacle-like hopper 17 is attached to an inlet port 47 on that side of the housing 11 defining the grinding chamber portion 13 for receiving refuse and directing it downward toward the grinding blades 49. Attached to the fan chamber portion 19 of the housing 11 is a cone-shaped tube 29 for receiving larger branches and directing them to a chipper plate 27. Such plate 27, which has several knives 51 mounted on it, "slices" the branches into small chips. Such chips are then expelled from the fan discharge port 23.

Figure 9:
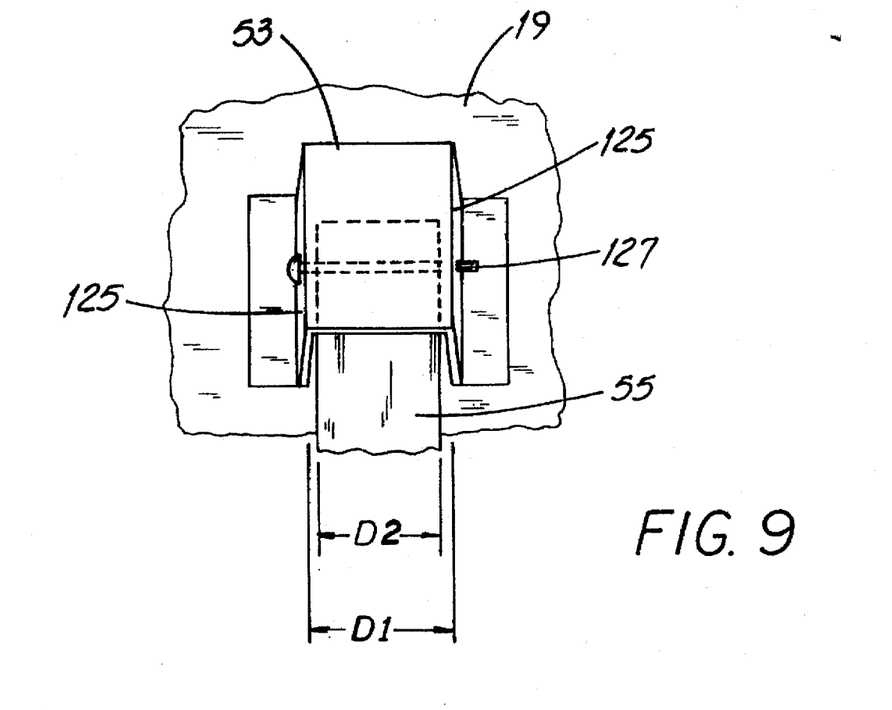
FIG. 9 is an elevation view of the strut and strut mounting bracket shown in FIGS. 1 and 2. Parts are broken away.

Referring also to FIG. 9, a strut mounting bracket 53 is secured to the outer surface of the fan chamber portion 19 of the housing 11 and supports a ground-contacting strut 55 when the machine 10 is in use. That is, the machine 10 normally rests on the two wheels 37 and on the strut 55.

Figure 1:
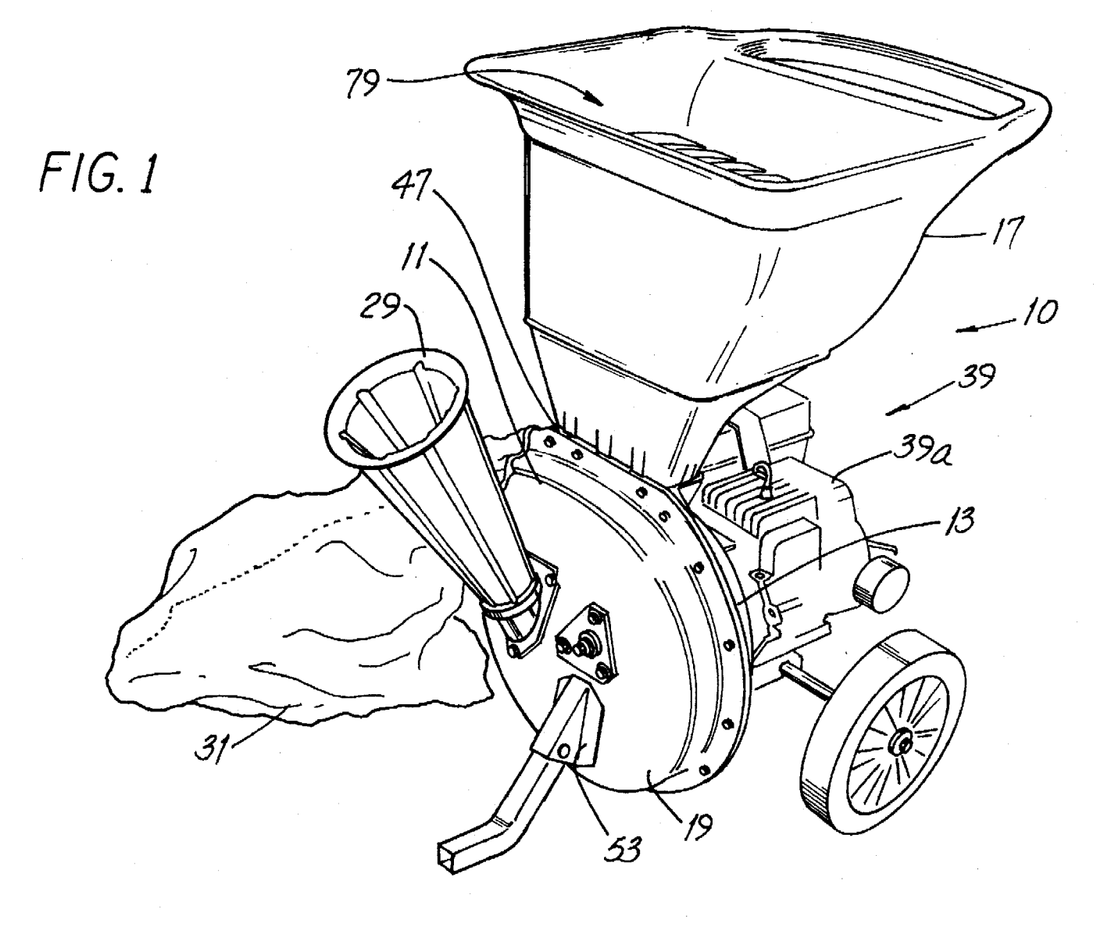
FIG. 1 is a perspective view of the new chipper shredder machine.
Figure 2:
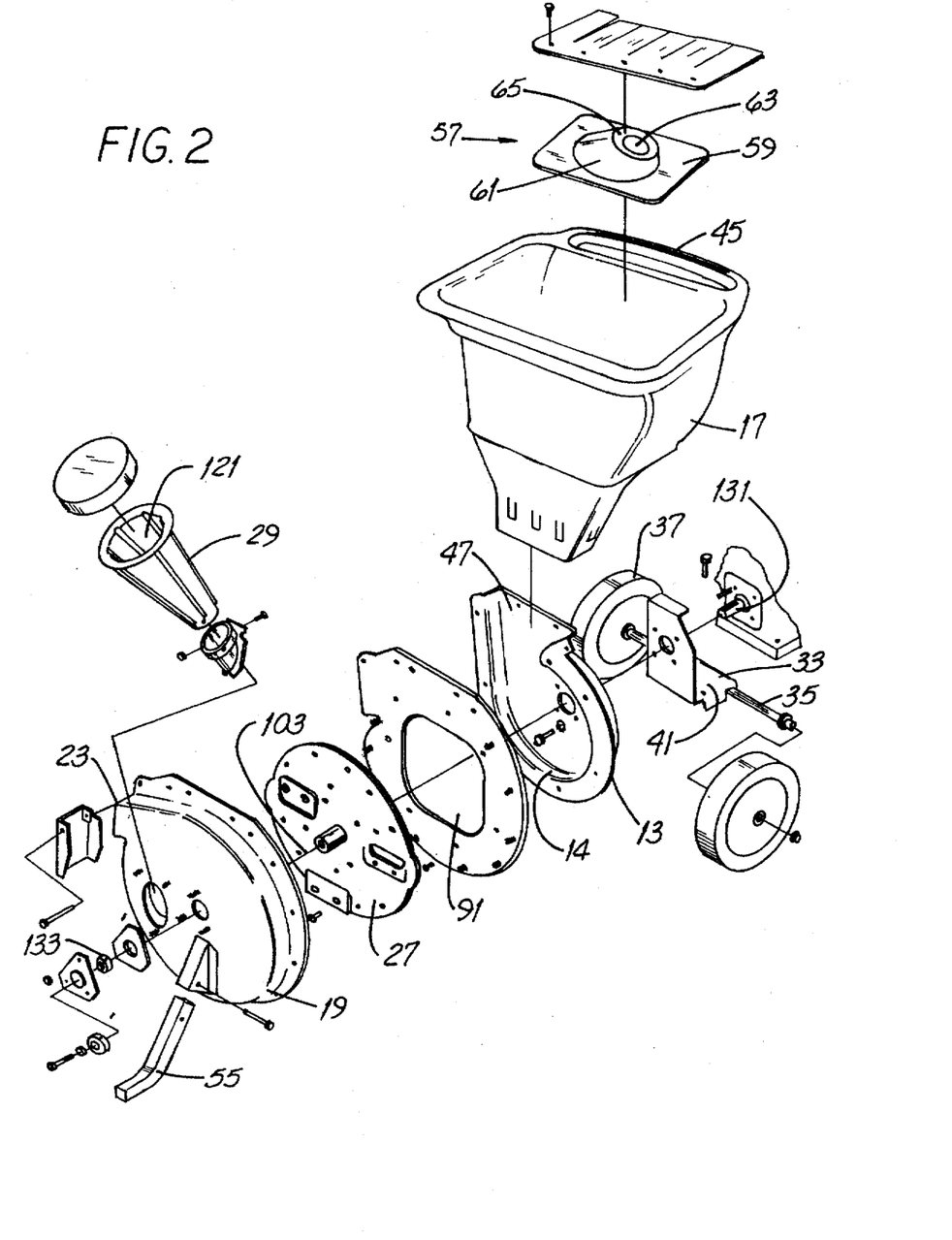
FIG. 2 is an exploded view of the machine of FIG. 1.
Figure 3:
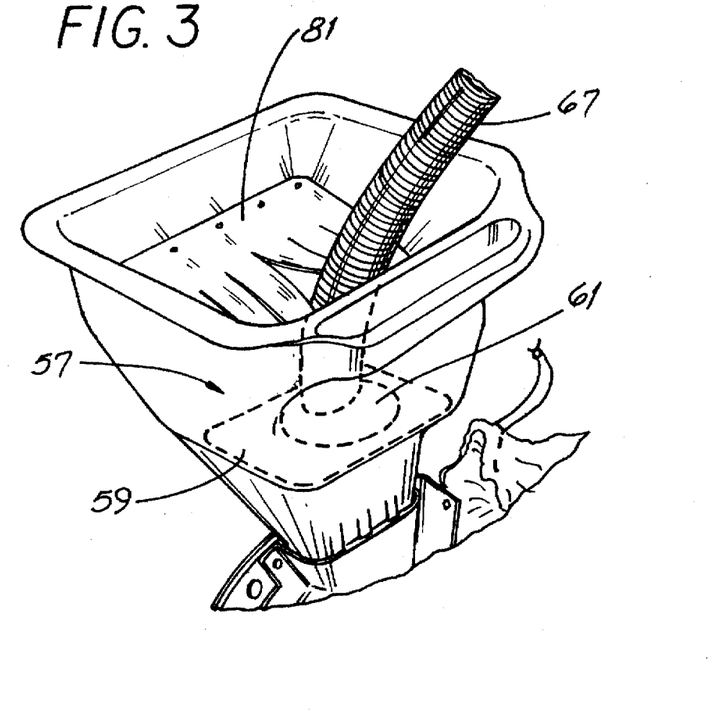
FIG. 3 is a more detailed view of aspects of the hopper of the machine of FIG. 1.
Figure 4:
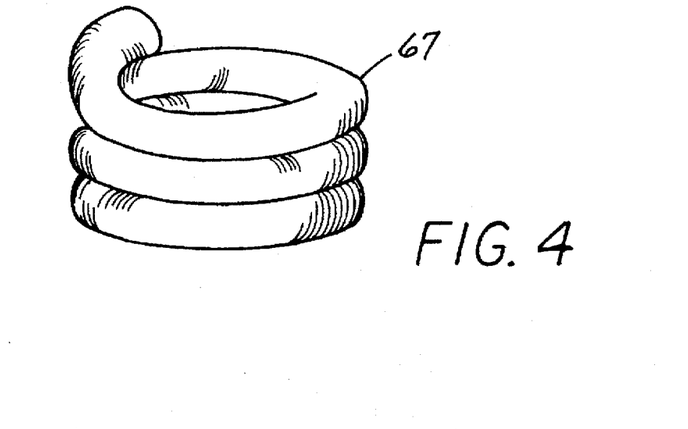
FIG. 4 is a perspective view of exemplary vacuum hose useful with the machine of FIG. 1.
Figure 11:
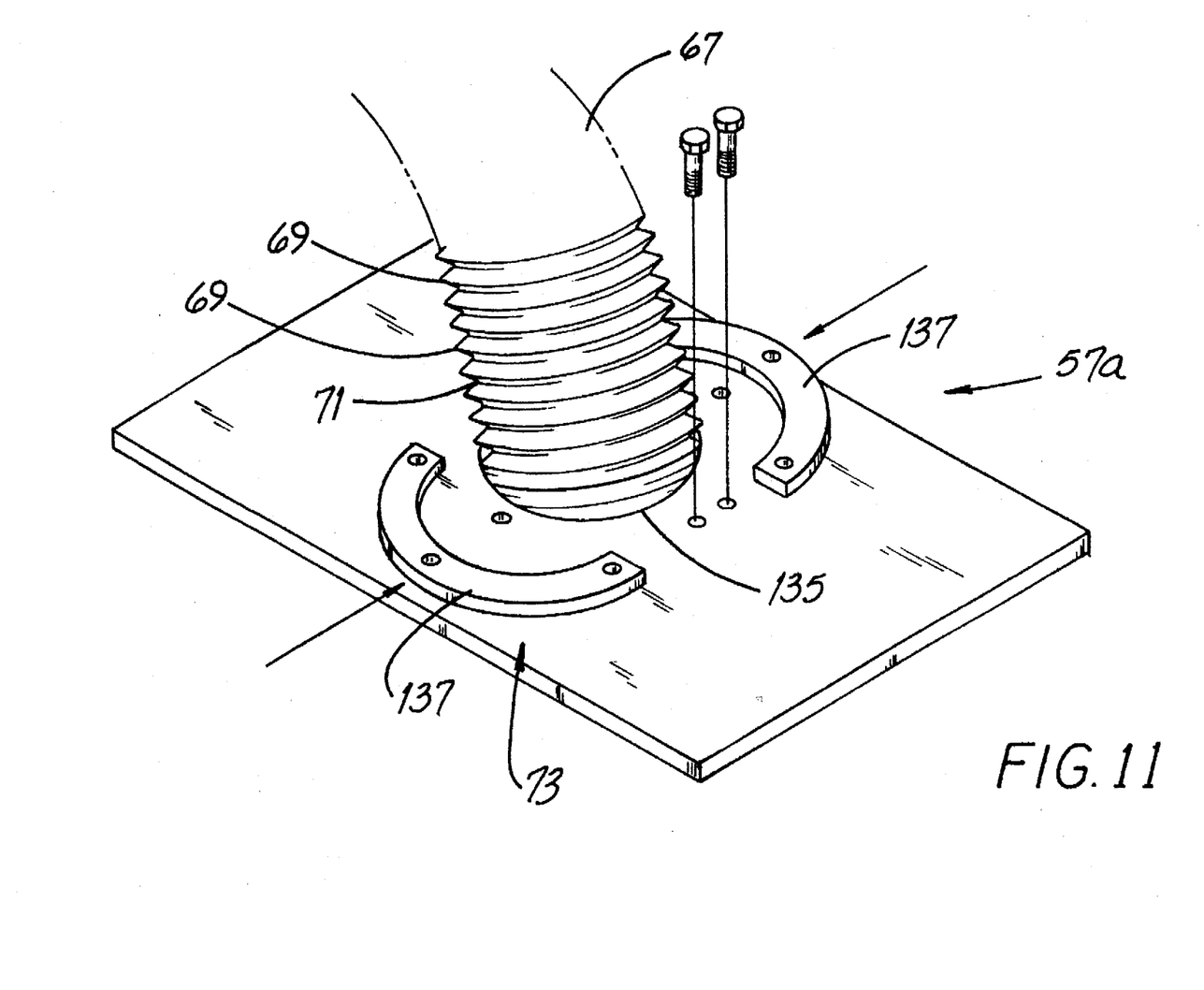
FIG. 11 is a perspective view of an alternate embodiment of a vacuum adapter plate.

A more detailed description of aspects of the new chipper shredder machine 10 will now be set forth. Referring to FIGS. 2, 3 and 11, the machine 10 includes a unique metal or plastic vacuum adapter 57 having a rectangular flange 59 from which protrudes a rounded boss 61 having a circular opening 63. Fitted to the perimeter of the opening 63 is a resilient ring-like collar 65, the inside aperture diameter of which is selected in view of a diameter of the vacuum hose 67 depicted in FIG. 4. A suitable adapter 57, made for an entirely different purpose, is available from Oatey Company and is known as its "NO-CALK" roof-mount fitting.

Preferably, such hose 67 comprises a length of irrigation or drainage hose which includes a plurality of spaced circumferential ribs 69. The diameter of the collar aperture is preferably selected to be somewhat less than the smallest outside diameter of the hose 67. Such hose 67 is thereby readily urged into the collar 65 and well retained by the collar 65 which "seats" in a groove 71 between a pair of ribs 69 and seals around the hose 67. However, the hose 67 can turn within the collar 65. An alternate embodiment of a vacuum adapter 57a using a hoop-like C-clamp device 73 is described below in connection with FIG. 11.

There are at least four important benefits from the arrangement described above. One is that the hose 67 can be attached to and removed from the adapter 57 without the use of tools. Another is that since the hose 67 extends nearly vertically out the top of the hopper 17, the hose 67 is readily pivoted to "point" in any direction 360° around the machine perimeter. One does not need to "dedicate" a substantial length of hose 67 merely to get its distal end to that side of the machine 10 where it is used as a vacuum wand to pick up leaves, other lawn refuse, etc.. In contrast, consider the side-mounted hose arrangement shown in the aforementioned Peck et al. patent.

A third benefit is that, as described below, the adapter 57 itself can be quickly attached and removed without the use of tools. A fourth benefit is that the hose 67 and the adapter 57 are mass-produced, relatively-low-cost products (made for disparate purposes) and this has important implications for reducing the cost of the machine 10.

Figure 5:
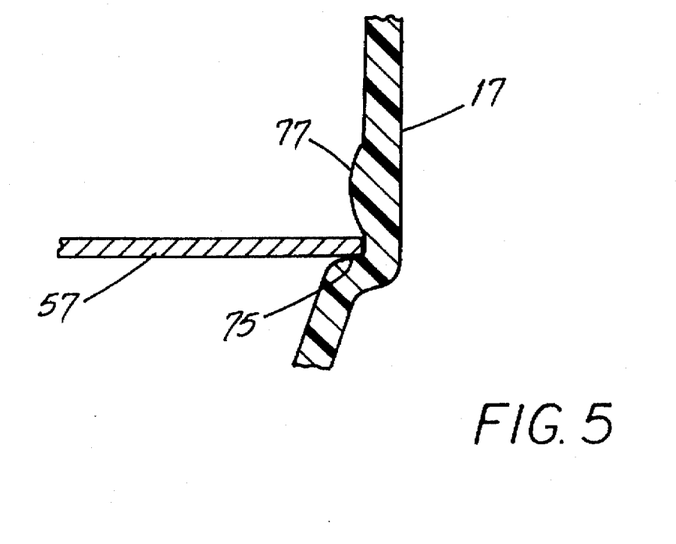
FIG. 5 is a section view of a portion of the machine hopper and of a vacuum hose adapter mounted therein.
Figure 6:
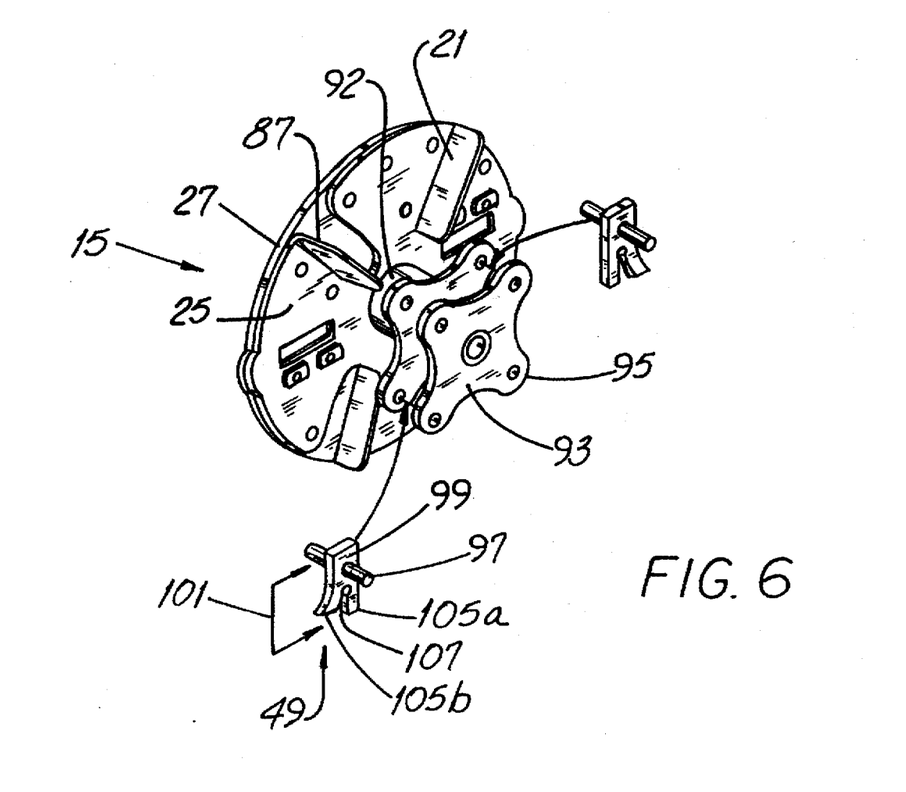
FIG. 6 is a partially-exploded view of the comminuting and fan assembly of the machine.

Referring further to FIGS. 2 and 3 and also to FIG. 5, the hopper 17 has a shoulder 75 extending at least partially around its interior perimeter. The adapter 57 is retained on the hopper 17 in shoulder-abutting relationship so as to seal well against the shoulder 75. Adapter retention is preferably by at least one bump-like projecting member 77 (and preferably several such members 77) molded into or attached to the inner surface of the hopper 17 and positioned adjacent to but spaced slightly from the shoulder 75. Whether being mounted or removed, the adapter 57 is readily urged over the members 77 and "snapped" into or out of the hopper 17 without the use of tools.

Whether or not the vacuum adapter 57 and hose 67 are used, the mouth 79 of the hopper 17 is obstructed by a multi-fingered guard 81 attached near one edge of the hopper 17. The guard helps prevent debris from being projected out of the hopper 17 and also discourages insertion of a hand or arm into the hopper 17 and, possibly, into the grinding portion.

Considering FIGS. 2, 6, 7 and 8A, the machine 10 has a wheel-like comminuting and fan assembly 15 which rotates within the housing 11 at relatively high speed. Such assembly 15 includes a generally planar chipper plate 27 having plural openings 83. A chipping knife 51 is attached adjacent to each opening and as indicated by the arrows 85, rotation of the assembly 15 is in a direction so that branches and the like fed into the machine 10 through the tube 29 are "sliced" bologna-style into small chips, whereupon such chips are blown out the discharge port 23. The knives 51 are mounted in a unique way explained below in connection with a further discussion of FIGS. 7 and 8A, 8B and 8C.

Back-to-back with the chipper plate 27 is a generally planar fan plate 25 having outwardly-bent blades 87. The plates 25, 27 are attached to one another by bolts, rivets 89 or the like. The blades 87 produce air flow which urges material being comminuted in the grinding chamber portion 13 to "migrate" through the opening 91 in the divider plate 93 and be blown out the discharge port 23. And of course, chips cut from limbs by the knives 51 are also blown out. It is to be appreciated that the chipper plate 27 and the fan plate 25 are in the fan chamber portion 19 of the housing 11.

In one embodiment configured for use with a gasoline engine 39a as a prime mover 39, the plates 25, 27 are both steel. In another embodiment configured for use with an electric motor as a prime mover 39, the chipper plate 27 is fabricated of aircraft-quality aluminum plate for reduced weight.

The fan plate 25 and fan chamber portions 19 are cooperatively sized and configured to provide what is generally known as a scroll-type centrifugal blower. On its suction side, such blower creates negative pressure by drawing in air (with or without entrained refuse) through the inlet port 47 and on its discharge side, creates positive air pressure at the discharge port 23.

The assembly 15 also has an extending boss 92 to which is attached a pair of generally cloverleaf-shaped grinding rotors 93, neither of is in the fan chamber portion 19. Each rotor 93 has several radially outwardly extending lobes 95 and a stud 97 extends between the corresponding lobe 95 of each rotor 93 for mounting a free-swinging comminuting blade 49. That is, each blade 49 is free to swing 360° about the stud long axis.

Each blade 49 has a blade body 99 coincident with a plane 101 (such plane 101 being normal to the axis of rotation 103) and also has a pair of comminuting fingers 105 extending from the body. One finger 105a is substantially coincident with the plane 101 and the other finger 105b is bent away from the plane 101. And the fingers 105 are spaced apart by a slot 107. An advantage of this type of blade 49 is that, unlike the blades depicted in the Fortney and Reschke patents mentioned above, twigs and similar refuse are less likely to get caught between the blade fingers 105 and simply be carried around by a blade rather than being comminuted thereby.

It is to be appreciated that neither grinding rotor 93 nor the blades 49 are in the fan chamber portion. And, preferably, the opening 91 is a square with rounded corners; no inwardly-protruding scallop-like edges are included or necessary.

Referring to FIGS. 2, 7, 8A, 8B and 8C, the seat 109 for the chipper knife 51 is formed in a unique way that results in very little added manufacturing cost above that incurred to attach the fan plate 25 and the chipper plate 27 to one another. Attachment of the plates 25, 27 is preferably by rivets 89, one of which is shown in its undeformed configuration in FIG. 8B. The plates 25, 27 and the rivet 89 therethrough are rested on a platen 111 and impacted by a rivet setting tool, not shown.

Figure 8C:
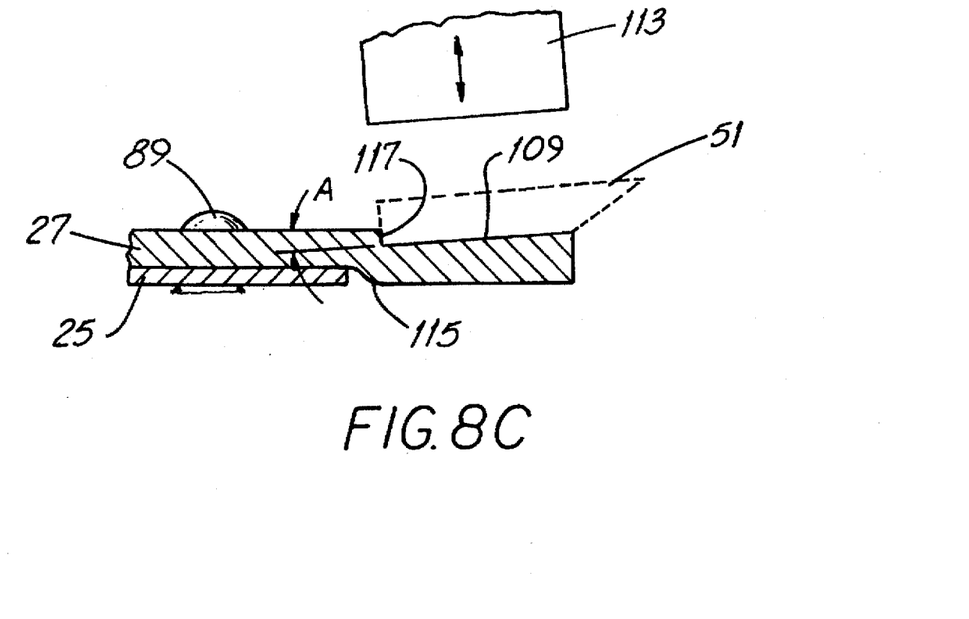
FIG. 8C is an inverted view generally like that of FIG. 8B and showing the chipper plate and the rivet subsequent to securement by rivet deformation. Also shown is a knife-receiving pocket formed simultaneously with securement.

Simultaneously, a sharp-shouldered seat forming tool 113 impacts the chipper plate 27 and upset-forms the surface thereof to define a pocket-like knife-receiving seat 109. The seat 109 is at an angle "A" of about 2°–3° with the surface of the chipper plate 27 to provide what is known as "back relief" to the knife. As the chipper plate 27 is upset formed, its opposing surface 115 bulges outward as shown in FIG. 8C.

A significant aspect of the foregoing is that no metal is removed from the chipper plate 27; rather, such metal is deformably upset. The ledge 117 resulting from such operation provides a bearing surface which "backs up" the knife 51 during chipping operations. This back-up feature (which is known per se) helps avoid straining and shearing the bolts 119 holding the knife 51 to the plate 27.

Referring again to FIG. 2, a tapered, cone-like tube 29 is coupled to the fan chamber portion 19 of the housing 11 for directing tree branches toward the chipper plate 27. The tube 29 includes a branch-receiving mouth 121 and the machine 10 has a fully removable disc-like closure 123 for sealing the mouth 121 when lawn refuse is flowing through the hose 67 or is being otherwise fed into the hopper 17.

When the tube 29 is so sealed, the vacuum capability of the machine 10 is increased and the adapter-attached hose 67 does a better job of picking up lawn refuse. In a highly preferred machine 10, the closure 123 is sized and shaped to fit a commercially-available frozen food container and is available from a vendor of such containers. One exemplary closure is from a plastic, tub-like ice cream container.

Referring now to FIGS. 2 and 9, it will be recalled that the new machine 10 has a substantially-reduced tendency to dance or walk on a hard surface during use. A feature believed to be responsible for this characteristic involves a scoop-shaped strut mounting 53 bracket attached to the fan chamber portion 19 of the housing 11. The bracket 53 includes a pair of support members 125 which are spaced by a first dimension "D1." The strut 55 is attached to the bracket 53 by a pin 127 and, preferably, has a width second dimension "D238 no more than about 95% of the first dimension "D1." While not wishing to subscribe to any particular theory as to why this arrangement helps reduce vibration, it is believed that housing vibration is significantly isolated from the strut 55 because of the strut-bracket spacing.

Figure 10:
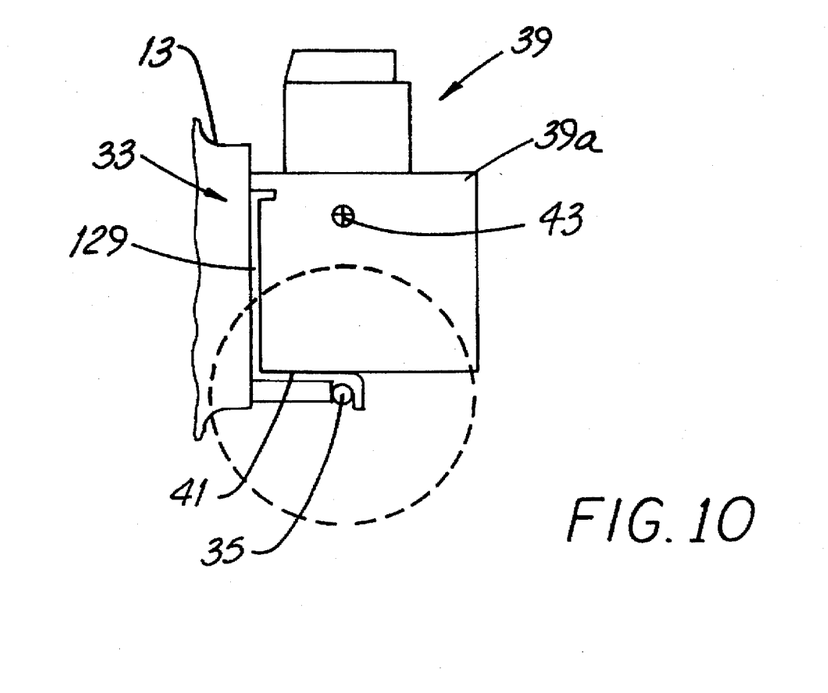
FIG. 10 is a side elevation view showing the relative location of the prime mover center of gravity and the wheel axle.

As depicted in FIGS. 2 and 10, a generally L-shaped prime mover mounting bracket 33 has its vertical panel 129 attached to the grinder portion 13 of the housing 11. The bracket platform 41 extends away from such portion 13 and has a machine-supporting axle 35 mounted to it. A prime mover 39, e.g., an internal combustion engine 39a, has a center of gravity 43 substantially vertically above the axle 35. And such center of gravity 43 is relatively closely spaced to the axle 35. The former feature permits the machine 10 to be readily tipped and wheeled "cart fashion" to a new location using the convenient handle 45. The latter feature improves machine stability in that the machine 10 is not "top heavy."

There is another factor which undoubtedly contributes to the fact that the machine 10 is relatively immobile in use, even on a hard surface. The prime mover drive shaft 131 (which powers the comminuting and fan assembly 15) extends through the housing 11 and is supported at its distal end by a bearing 133 in the fan portion 19 of the housing 11. This arrangement substantially avoids the shaft "whip" which often attends a cantilevered shaft (a shaft supported at only one end) rotating slightly unbalanced loads.

FIG. 11 illustrates an alternate embodiment of a vacuum adapter plate 57a which is sheet-like, generally planar and has an opening 135 through it sized to receive the end of a hose 67. Two C-brackets 137 are attached to the plate 57a and when so attached, they seal against the hose 67 between a pair of ribs 69.

The embodiment of FIG. 11 offers the benefits of good vacuum seal against the hose 67, easy 360° pivoting rotation of the hose 67, easy attachment to and removal from the hopper 17 (in the same way as described above) and inexpensive manufacturing cost. The hose 17 is attached by minimal use of tools and once attached, need only rarely be removed.

Figure 12:
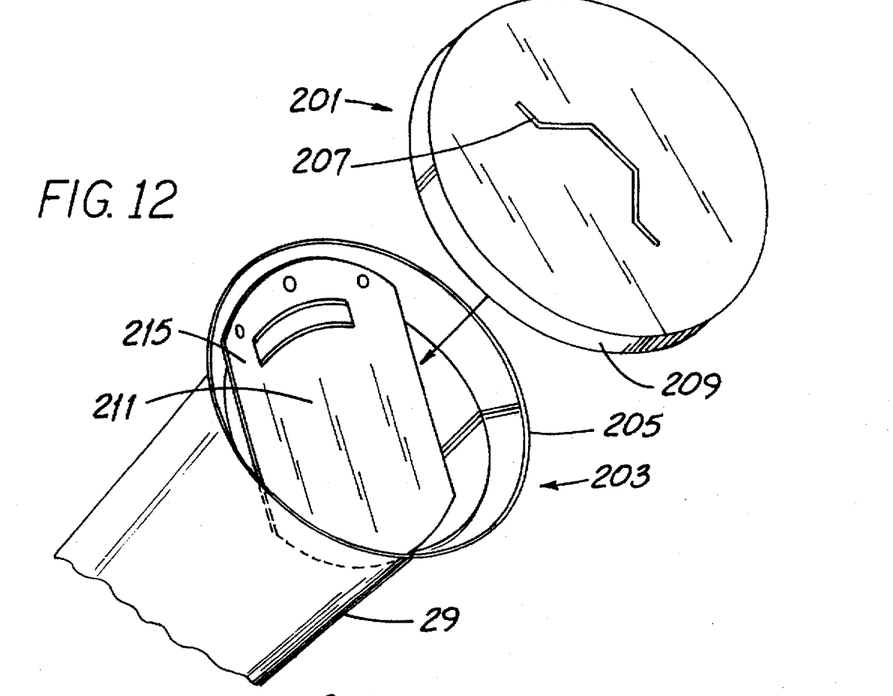
FIG. 12 is a perspective view of the input end of the machine branch-receiving tube with tube closure and "kickback" shield. Parts are broken away.
Figure 13:
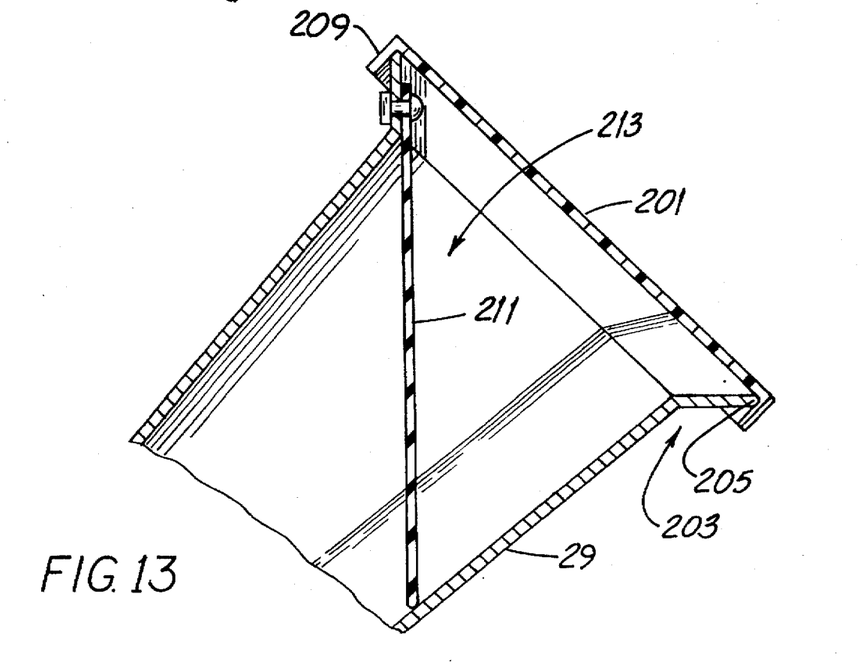
FIG. 13 is a cross-sectional view of the tube, closure and shield shown in FIG. 12. The closure is in place on the tube.

Referring next to FIGS. 12 and 13, other details of the cone-like tube 29 and tube-sealing closure 201 will now be described. The tube 29 is tapered, is generally circular in cross-section along its length and terminates in a flared mouth portion 203 having a substantially smooth sealing lip 205.

The removable closure 201, for which the handle 207 is optional, fits snugly to the lip 205 and substantially prevents air from flowing between the lip 205 and the closure 29. The machine vacuum is thereby enhanced when material is being introduced into the hopper 17. In a highly preferred embodiment, the closure 201 includes an edge portion 209 extending down over and overlapping the lip 205. Such edge portion/lip "overlap" increases the sealing area for better air flow prevention.

Preferably, the tube 29 also includes a deflector shield 211 attached to the mouth portion 203 and extending across the tube passage 213. The shield 211 has a flexible portion 215 so that when a small tree branch or the like is inserted into the tube 29, the shield 211 swings downwardly toward the machine housing 11. Such shield 211 does not close off the passage 213 but rather only helps to prevent "kickback" of pieces upward out of the tube 29.

Another aspect of the invention involves a method for comminuting lawn refuse comprising leaves and small branches. Such method includes the steps of providing the machine 10 with its housing 11 and tube 29, the latter for introducing material into the housing 11. After the closure 201 is fitted snugly to the lip 205, leaves, very small twigs and the like are then introduced into the housing 11 through the hopper 17 or (in a "walk-behind" machine) through a bottom opening through which organic debris is drawn by vacuum into the housing 11 and grinding chamber portion 13.

When the user desires to comminute branches rather than leaves and twigs, the closure 201 is removed and small branches and the like are then introduced into the housing 11 through the tube 29. In a highly preferred method, the fitting step includes urging the closure 201 over the lip 205 so that the edge portion 209 overlaps such lip 205.

Figure 14:
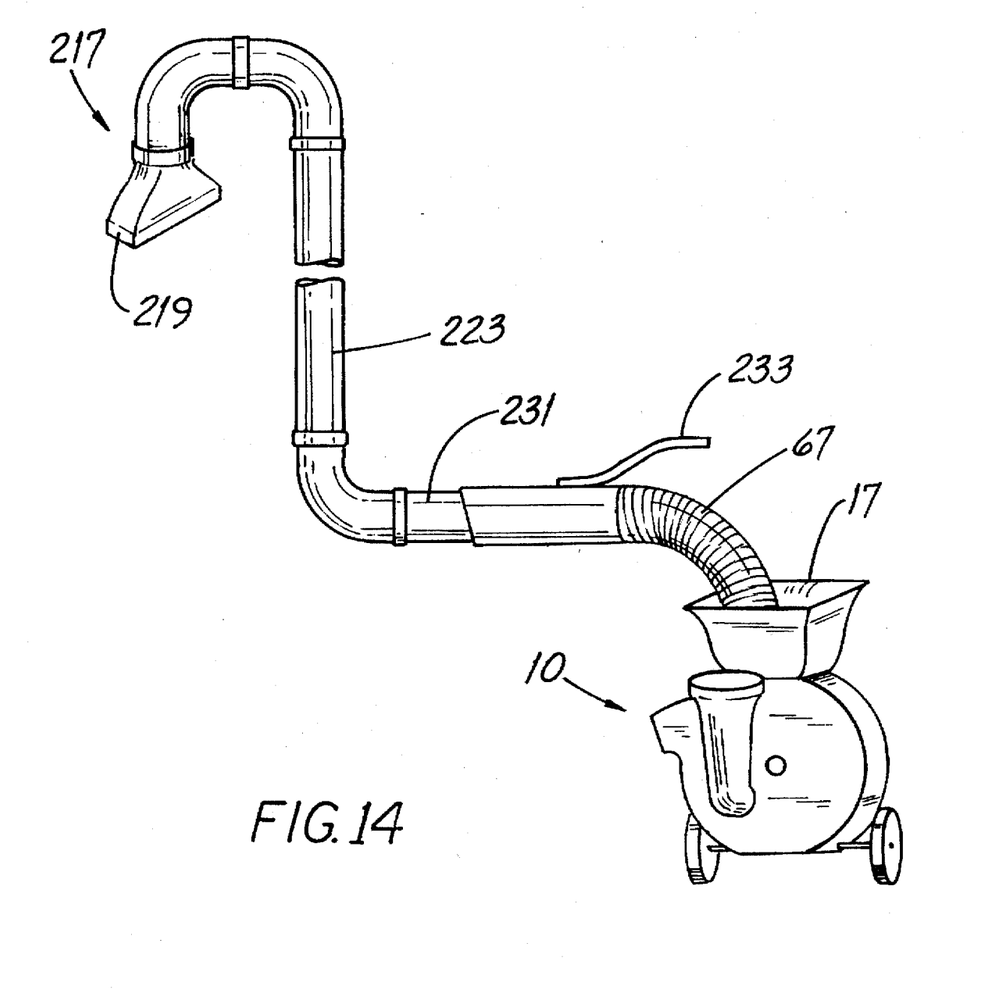
FIG. 14 is a perspective view of one embodiment of a vacuum nozzle attachment useful for cleaning out eaves troughs.
Figure 15:
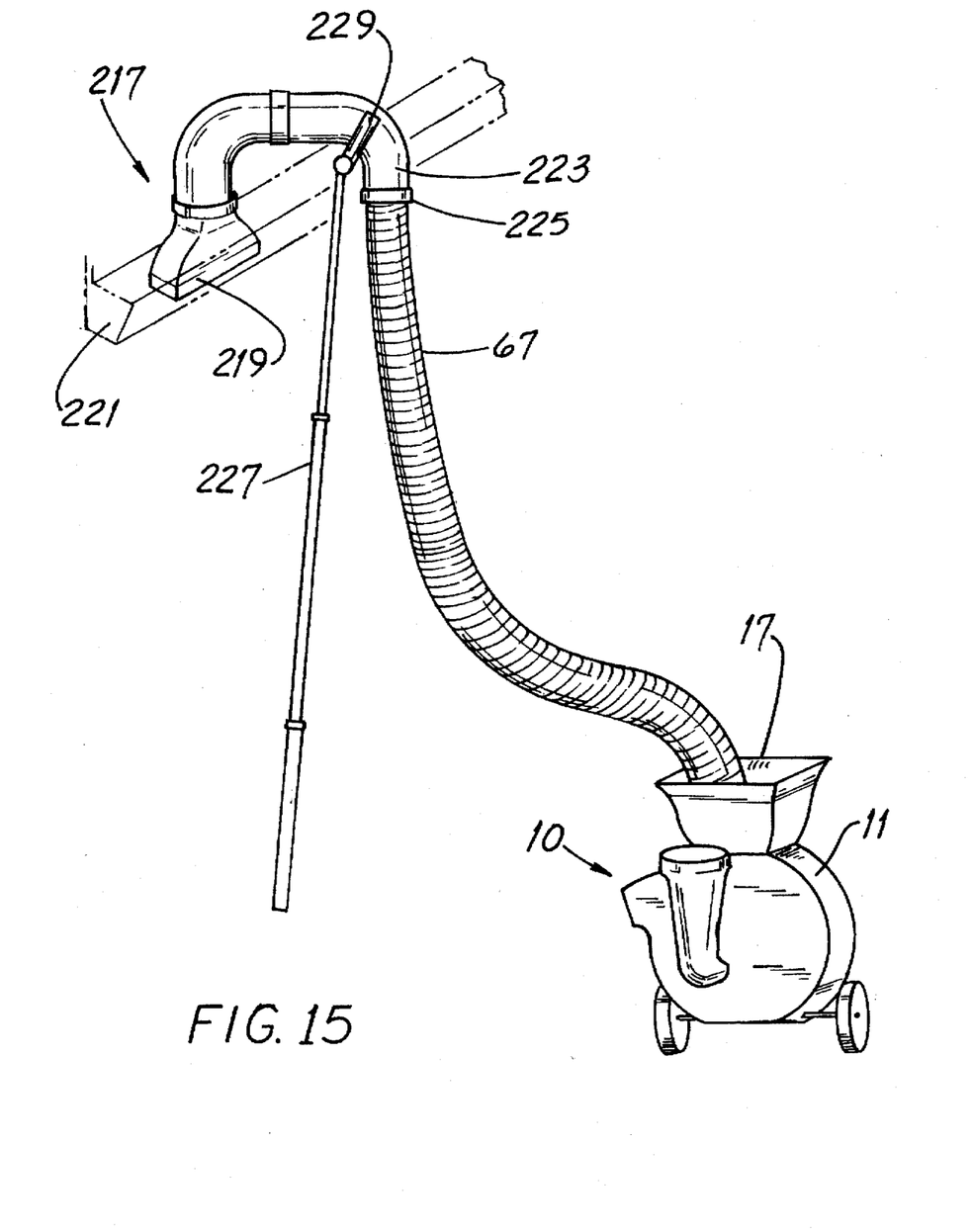
FIG. 15 is a perspective view of another embodiment of a vacuum nozzle attachment useful for cleaning out eaves troughs.

Referring next to FIGS. 14 and 15, the machine 10 has another use-enhancing feature. In another aspect of the invention, the machine is equipped with a hopper 17 and one end of a flexible hose 67 is attached to such hopper 17. The other end of the hose 67 has a vacuum nozzle 217 attached to it.

The vacuum nozzle 217 is generally U-shaped, substantially rigid and has a relatively-thin fanned-out portion 219 for insertion into the trough 221. In the arrangement of FIG. 15, the nozzle 217 has a relatively short downwardly-extending rigid leg portion 223 attached to one end of the length of flexible hose 67. The end 225 of such leg portion 223 is nominally at the elevation of the trough 221 when the nozzle 217 is in use. Such nozzle 217 is conveniently manipulated and guided along the trough 221 by a person standing on the ground and using a pole 227 with a nozzle grasping member 229.

In the arrangement of FIG. 14, the rigid leg portion 223 is elongate and has an extension piece 231 which extends laterally when the nozzle 217 is in use. Such extension piece 231 and the hose are coupled to one another. In such arrangement, the vacuum nozzle 217 is manipulated by grasping the elongate leg portion 223 or by using the attached handle 233. And, of course, the pole 227 may be used for nozzle manipulation.

The machine 10 is thereby configured to remove leaves and debris from a location other than at ground level, e.g., from the eaves trough 221. The machine 10 is much more versatile in application than conventional machines and the owner obtains much better utilization of the investment in such machine 10.

While the principles of the invention have been described in connection with specific embodiments, it is to be understood clearly that such embodiments are exemplary and are not limiting.

What is claimed is:

1. In a machine for comminuting lawn refuse and including (a) a housing containing a chipper plate, (b) a hopper mounted atop the housing, and (c) a tube for feeding branches toward the chipper plate, the improvement comprising:

a vacuum adapter mounted to the hopper;

a hose attached to the vacuum adapter; and a generally U-shaped vacuum nozzle attached to the hose, such nozzle having a fanned-out portion for insertion into an eaves trough and a rigid leg portion attached to the hose, whereby the machine is configured to vacuum leaves and debris from an eaves trough.

2. The machine of claim 1 wherein the leg portion is elongate and includes a lateral extension piece angularly connected to the leg portion for hose attachment.

* * * * *